(12) United States Patent
Chao et al.

(10) Patent No.: US 7,362,309 B2
(45) Date of Patent: Apr. 22, 2008

(54) POINTING DEVICE WITH FLEXIBLE SHAPE

(75) Inventors: Shih-Hung Chao, Taipei Hsien (TW); Zhan-Ling Liu, Ho-Nan Province (CN)

(73) Assignee: Darfon Electronics Corp., Gueishan, Taoyuan (TW)

( * ) Notice: Subject to any disclaimer, the term of this patent is extended or adjusted under 35 U.S.C. 154(b) by 672 days.

(21) Appl. No.: 10/708,245

(22) Filed: Feb. 19, 2004

(65) Prior Publication Data
US 2004/0169640 A1 Sep. 2, 2004

(30) Foreign Application Priority Data
Feb. 27, 2003 (TW) .............................. 92104324 A

(51) Int. Cl.
G06F 3/033 (2006.01)
G09G 5/08 (2006.01)

(52) U.S. Cl. ...................................................... 345/164

(58) Field of Classification Search ........ 345/156–160, 345/162–167, 184; D14/402–410, 458–461
See application file for complete search history.

(56) References Cited

U.S. PATENT DOCUMENTS

| 5,260,696 | A | * | 11/1993 | Maynard, Jr. | ............... 345/163 |
| 5,490,647 | A | * | 2/1996 | Rice | ......................... 248/118.1 |
| 5,847,696 | A | * | 12/1998 | Itoh et al. | .................... 345/163 |
| 5,990,870 | A | * | 11/1999 | Chen et al. | .................. 345/163 |
| 6,157,370 | A | * | 12/2000 | Kravtin et al. | .............. 345/163 |
| 6,304,249 | B1 | * | 10/2001 | Derocher et al. | ........... 345/163 |
| 6,396,478 | B1 | * | 5/2002 | Kravtin et al. | .............. 345/163 |
| 6,489,947 | B2 | * | 12/2002 | Hesley et al. | ............... 345/163 |
| 6,600,479 | B1 | * | 7/2003 | Smith et al. | ................. 345/163 |
| 6,616,108 | B1 | * | 9/2003 | Brophy et al. | ........... 248/118.1 |
| 6,921,054 | B2 | * | 7/2005 | Doan | ...................... 248/118.5 |
| 6,970,156 | B1 | * | 11/2005 | Silverstein | ................... 345/163 |
| 7,119,791 | B2 | * | 10/2006 | Iwasaki | ....................... 345/163 |

FOREIGN PATENT DOCUMENTS

TW           343762           10/1998

* cited by examiner

Primary Examiner—Jeff Piziali
(74) Attorney, Agent, or Firm—Winston Hsu

(57) ABSTRACT

A pointing device includes a housing, a main body and an input section. The housing contains an upper cover and two extending arms, which extended from the upper cover. The main body is housed under the upper cover and located between the two extending arms of the housing. The input section is placed on the front half of the main body for generating (inputting) key signals. The front half (the input section) and the back half of the main body form a smooth surface.

20 Claims, 5 Drawing Sheets

POINTING DEVICE WITH FLEXIBLE SHAPE

BACKGROUND OF INVENTION

1. Field of the Invention

The present invention relates to a pointing device, and more specifically, to a pointing device with a flexible shape.

2. Description of the Prior Art

These days, the GUI (Graphic User Interface), an interface that uses images, is the most popular operating interface of computer information systems. Users typically navigate a GUI with the use of a pointing device, is utilized to control the movements and positioning of a cursor on the screen of a computer. The idea of pointing devices has been embodied in various kinds of computer peripherals such as mice, joysticks and remote controllers.

Since a user is almost always in contact with the pointing device when navigating a GUI, the design shape of the pointing device becomes very important. Take, for example, the case of the pointing device the mouse. In today's market most mice are of fixed sizes. However, a mouse of fixed size cannot meet the needs of all its users because not every users palm is of the same size. Not meeting a users need could result in some ill effects on the users health. Therefore, the development of the design shape of a pointing device to meet the needs of users with different sized palms is much more important.

Please refer to FIG.1. FIG.1 is a diagram of the side view of a pointing device 10 with flexibility in size and shape according to the Taiwan Patent No. 343762. The pointing device 10 comprises a main body 11, a housing cover 12, and an input section 14. The main body 11 comprises a base 16 and is electrically connected to an electric device. A user can control the cursor displayed on the electric device by using the main body 11. The housing cover 12 can slide along the main body 11 and remain fixed along certain points. Therefore, a user can adjust the position of the housing cover 12 of the main body 11 to meet the needs of users with different sized palms. The input section 14 is placed on the main body 11. A user can transmit signals to the above-mentioned electric device by using the input section 14.

Furthermore, the pointing device 10 also comprises a guide 18 and a track 19. The housing cover 12 moves the track 19 via the guide 18. In addition, position holders 15 are placed above the track 19. With the guide 18 and the track 19, the pointing device 10 according to the prior art can alter the position of the housing cover 12 relative to the main body to change the shape and size of the pointing device 10. The adjusted position of the housing cover 12 is held in place by the position holders 15, thus fixing the shape and the size of the pointing device 10 according to the need of the user.

A byproduct of this design, though, is the presence of a space 17 between the main body 11 and the housing cover 12 when adjusting the shape and size of the pointing device 10. The size of this space 17 correlates with how far the housing cover 12 has been pulled along the track 19. This space 17, however, has many detractions from the pointing device 10.

For example, the presence of the space 17 affects the stability of the pointing device 10 when the pointing device is used. Having a space 17 means that the pointing device 10 no longer retains one continual surface for a users hand to rest upon. In addition, the space 17 is created by moving part of the housing cover 12 off the base 16. This means the part that moves off will be left hanging in midair, as shown in FIG.1. Furthermore, the presence of a space 17 is a place for dust and other debris to accumulate, which can then affect the operations of the pointing device 10. Finally, it is possible for a user to have his fingers fall into the space 17, resulting in inconvenience of operation or the injury. Hence, although the pointing device 10 has the advantage of being adjustable in shape and the size to accommodate the needs of users, it is not without its disadvantages.

SUMMARY OF INVENTION

It is therefore a primary objective of the claimed invention to provide a pointing device in order to solve the above-mentioned problems.

The claimed invention provides a pointing device. The pointing device comprises a housing, a main body, and an input section. The housing comprises an upper cover, two extending arms, a first edge, and a first bottom side. The two extending arms extend from the upper cover and rest on the sides of the main body, where they are retractable with respect to the main body while at the same time fix the main body in the upper cover of the housing. The main body comprises a front half, a back half, and a second bottom side. The input section is placed on the front half of the main body for generating (inputting) key signals. The front half with the input section on top and the back half of the main body form a smooth surface. A fixed space exists between this smooth surface and the first edge of the housing. This fixed space is only large enough for the housing to move away from the main body. Because the back half of the main body is located under the housing, as the housing is drawn away from the main body, the space does not get larger but simply exposes the back half, leaving a smooth surface intact for the user to rest his hand on. In addition, the first bottom side of the housing and the second bottom side of the main body are aligned. When the shape and size of the pointing device is adjusted, the first bottom side and the second bottom side basically remain on the (same) flat surface. When the positions of the main body and the housing relative to each other are adjusted, the first bottom side and the second bottom side remain on the (same) flat surface. Furthermore, the main body comprises a plurality of notches, and the housing comprises a latch that is utilized to in order to fix the adjustment made to the pointing device.

The pointing device according to the present invention further comprises a guide and a track that are placed between the housing and the main body, to allow the positions of the main body and the housing to be freely adjusted by movement along track via the guide.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
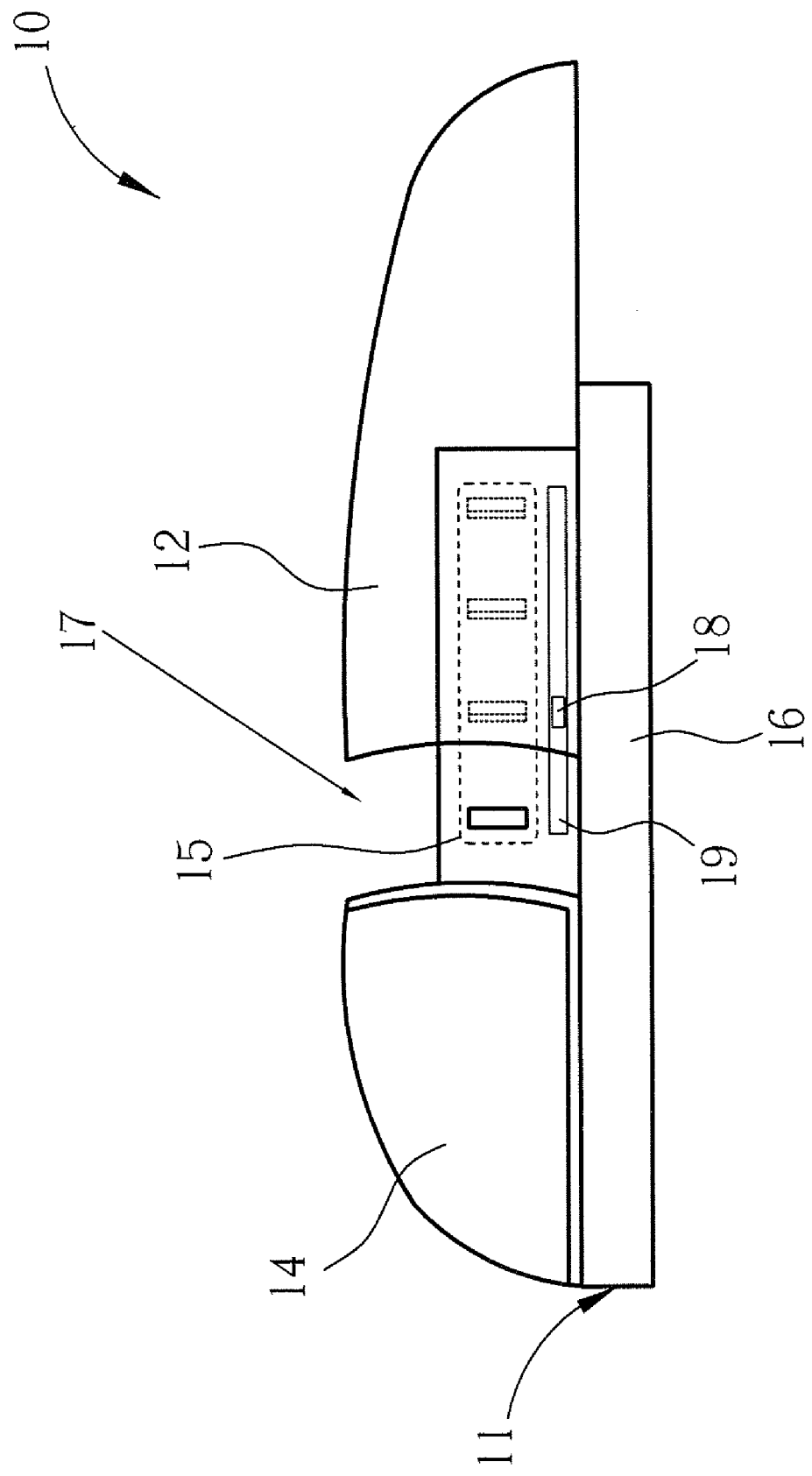
FIG. 1 is a diagram of a side view of a pointing device with flexibility in size and shape according to the prior art.
Figure 2:
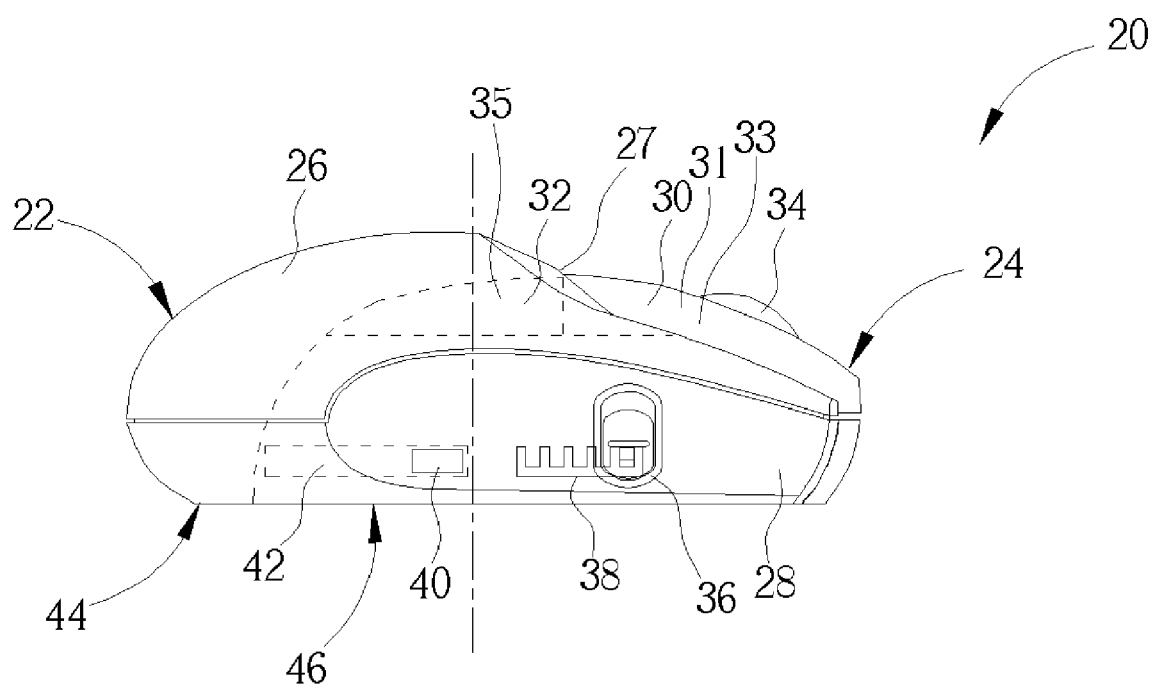
FIG. 2 is a diagram of a side view of the pointing device according to the present invention.
Figure 3:
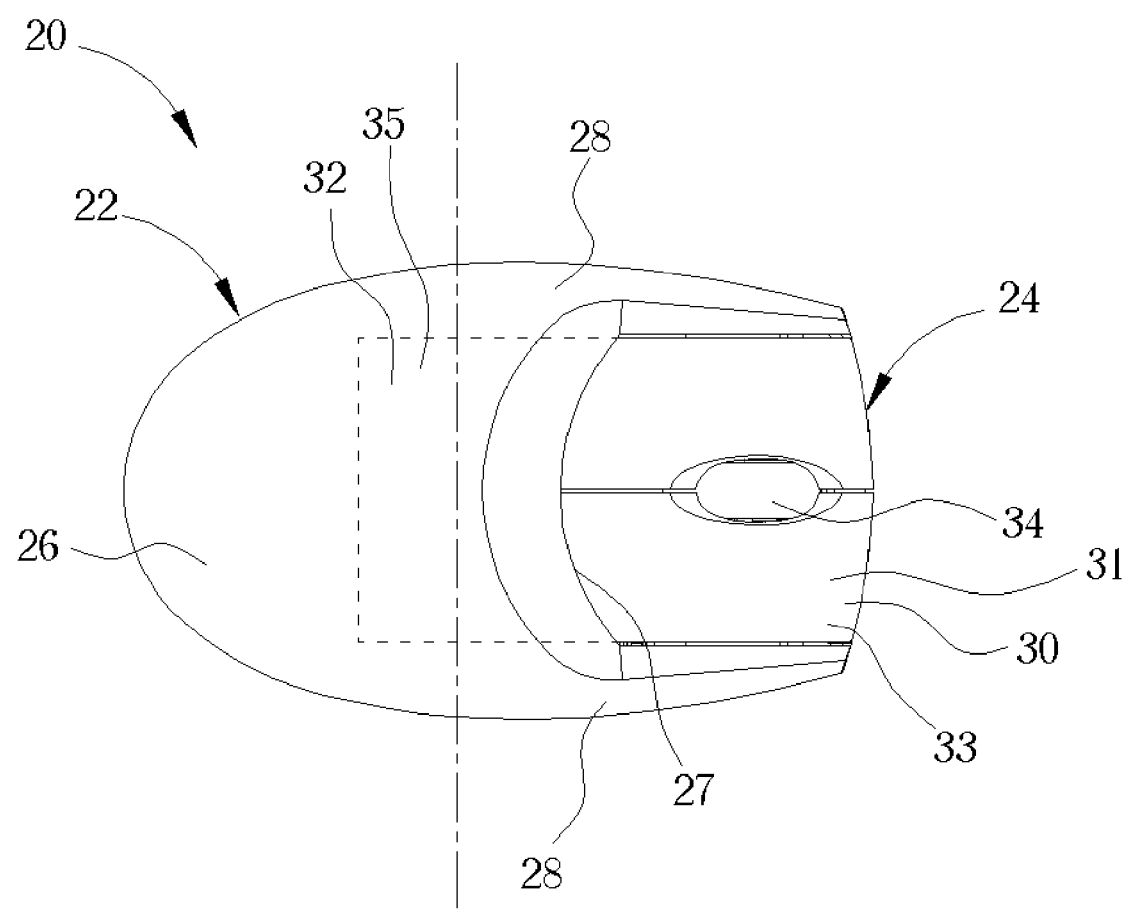
FIG. 3 is a diagram of a top view of the pointing device according to the present invention.

Please refer to FIG. 2 and FIG. 3 at the same time. FIG. 2 is a diagram of a side view of the pointing device 20 according to the present invention. FIG. 3 is a diagram of a top view of the pointing device 20 according to the present invention. The pointing device 20 comprises a housing 22 and a main body 24. The housing 22 comprises an upper cover 26 and two extending arms 28. The two extending arms 28 extend from the upper cover 26, giving the housing 22 the appearance of a tuning fork (the extending arms 28 being the prongs of the fork) when observed from above. Furthermore, when the main body 24 is within the housing 22, the front part of the two extending arms 28 of the housing 22 is flush with the front part of the main body 24. In addition, the housing 22 comprises a first edge 27, which is the edge of the upper cover 26, and a bottom side 44. As for the main body 24, it comprises a front half 30, a back half 32, and a bottom side 46. Resting on top of the front half 30 of the main body 24 is an input section 31, comprising buttons 33 and a wheel 34. The buttons 33 and the wheel 34 are utilized for generating (inputting) key signals. The top surface of back half 32 and the top surface of the front half 30 together form a smooth surface 35.

The contour where the front half 30, the back half 32, and the first edge 27 meet is approximately the same with a fixed space between the first edge 27 and the smooth surface 35 formed by the front half 30 and the back half 32. This fixed space aids in allowing the housing 22 to slide away from the main body 24. The bottom side 44 of the housing 22 and the bottom side 46 of the main body 24 are aligned in the same plane. Therefore, when the housing 22 is pulled away from the main body 24, the bottom side 44 of the housing 22, and the bottom side 46 of the main body 24 can be stably placed on the same flat surface. Hence, when a user is using the pointing device 20, the pointing device 20 can be kept in a stable state.

In order to allow the housing to draw away or move toward the main body 24, a guide 40 and a track 42 are placed between the housing 22 and the main body 24. Using the guide 40 and the track 42, the housing 22 and the main body 24 can change their positions with respect to each other and thereby, change the shape and the size of the pointing device 20. In order to graduate the range of change in the positions of the housing 22 and the main body 24, the housing 22 comprises a latch 36, and the main body 24 comprises a plurality of notches 38 to secure the latch 36. The latch 36 and the notches 38 are placed between the housing 22 and the main body 24. The detailed operations of the latch 36 and the notches 38 will be further described.

Figure 4:
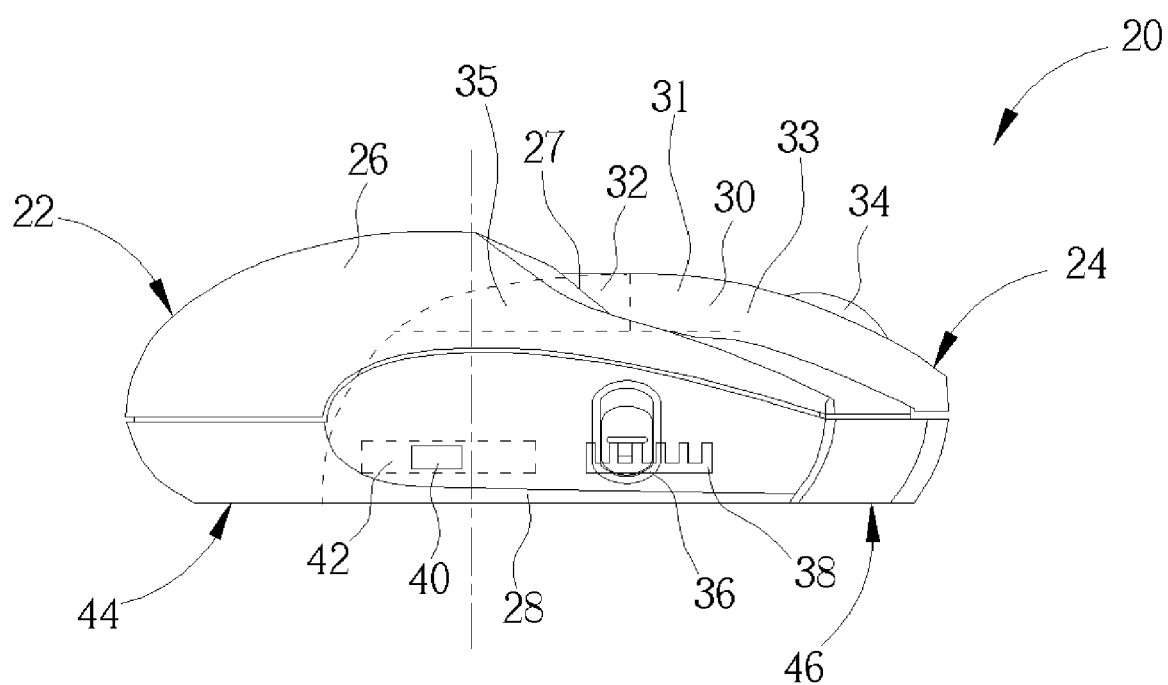
FIG. 4 is a diagram of a top view of the pointing device when the housing is extended away from the main body according to the present invention.
Figure 5:
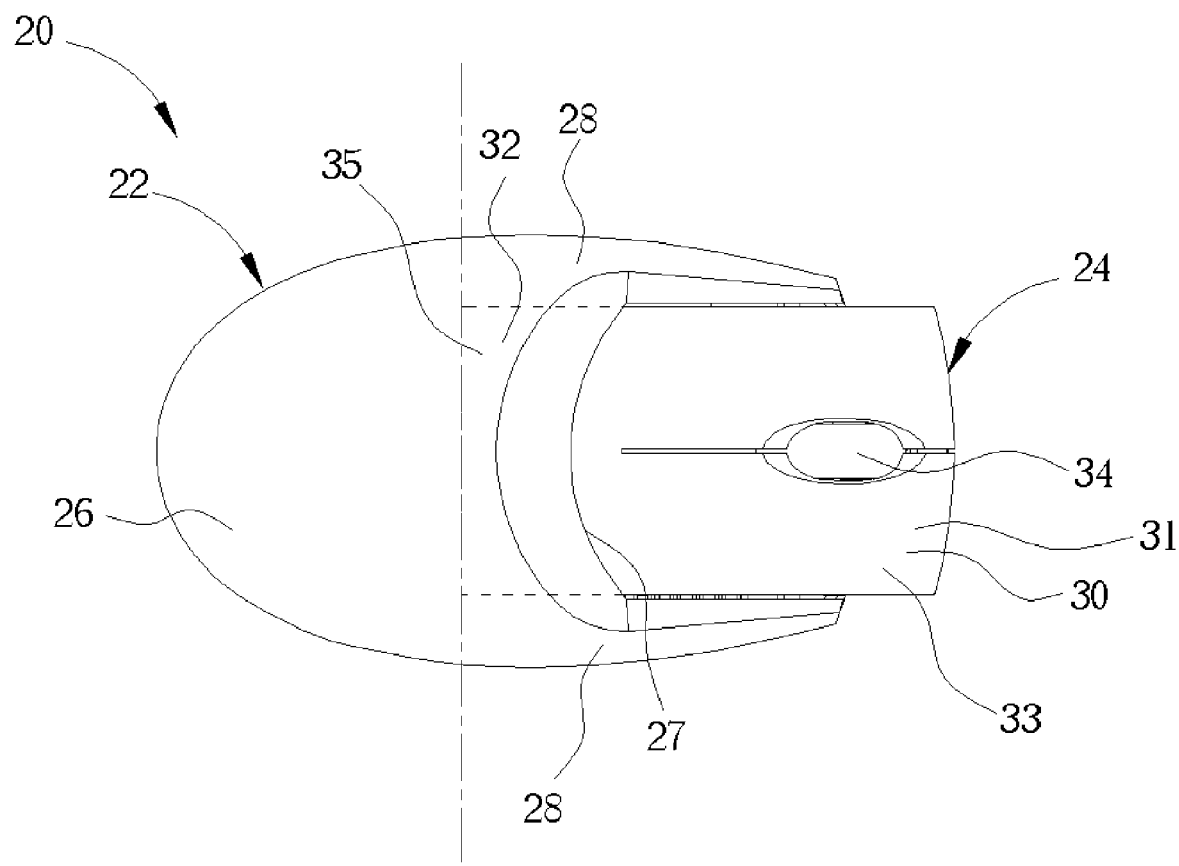
FIG. 5 is a diagram of a top view of the pointing device when the housing is extended away from the main body according to the present invention.

Please refer to FIG. 3 FIG. 5. FIG. 4 is a diagram of a side view of the pointing device 20 when the housing 22 is extended away from the main body 24 according to the present invention. FIG. 5 is a diagram of a top view of a pointing device 20 when the housing 22 is extended away from the main body 24 according to the present invention.

The housing 22 draws away from the main body 24 by using the moving along track 42 via the guide 40. At an initial position before the user draws the housing 22 away from the main body 24, the front part of the two extending arms 28 of the housing 22 is flush with the front part of the main body 24 as shown in FIG. 3. Only one of the extending arms 28 of the housing 22 can be observed from the side view, and the main body 24 surrounded by the two extending arms 28 hides in the housing 22. As shown in FIG. 4 and FIG. 5, when the pointing device 20 is in the state where the housing 22 is drawn away from the main body 24, the part of the main body 24 originally covered by the housing 22 can be observed from the top view.

When the point device 20 is in a state where the housing 22 is drawn away from the main body 24, the part of the main body 24 that was originally covered by the housing 22 i.e. the back half 32 will be uncovered. Because the input section 31 on the front half 30 and the back half 32 of the main body 24 of the pointing device 20 form a smooth surface 35 according to the present invention, when the back half 32 is uncovered from the upper cover 26 of the housing 22, the back half 32 of the main body 24 and the originally exposed input section 31 on the front half 30 still retains a smooth surface. Meanwhile, the fixed space at the place where the back half 32 of the main body 24 and the first edge 27 meet remains the same. Therefore, the problem of not being able to keep the front half 30 smooth in a pointing device according to the prior art is avoided. At the same time, because the bottom side 44 of the housing 22 and the bottom side 46 of the main body 24 are fixed at the same level, when the housing 22 is drawn away from the main body 24, the housing 22 and the main body 24 will remain on the same surface, which increases the stability of operations.

In the embodiment of the present invention, a latch 36 and a notch 38 are used to fix the position of the pointing device 20. However, this design and method of fixing the position should not be taken as a limitation. For example, as far as design goes, the latch 36 can be designed as having two teeth instead of one, or the teeth of the latch 36 can be designed to be in another shape such as a triangle instead of a square. As far as methods go, a hook and rods could be used, wherein a hook hooks onto one of a plurality of rods to fix the position of the pointing device 20 instead of using a latch 36 and notches 38. Whatever the method or design, the pointing device 20 has a system to fix the position of the pointing device 20.

Compared with the pointing device according to the prior art, the main body of the pointing device according to the present invention is fixed between the upper cover and the two extending arms of the housing. The back half of the main body and the input section on the front half of the main body together form a smooth surface. When the housing draws away from the main body, the back half of the main body was covered by the upper cover of the housing becomes exposed. Therefore, a smooth surface still remains and there is no big space. Without the space, the problem of dust and other debris accumulating and then affecting the operations of the pointing device that occurs in the front half of the pointing device according to the prior art is avoided. In addition, the inconvenience of operation of a pointing device of the prior or injuries such as getting ones finger caught can be avoided.

Also, the stability of the pointing device according to the present invention is not compromised as in the pointing device according to the prior art. In the pointing device according to the present invention, the bottom side of the housing and the bottom side of the main body of the pointing device are on the same flat surface. Therefore the situation that a part of the housing cover will be suspended in midair over the base can be avoided, thereby avoiding the disadvantage of instability operation.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A pointing device comprising:
   a housing comprising:
      an upper cover; and
      two extending arms;
   a main body retractably fixed under the housing, the main body comprising a front half and a back half, wherein the two extending arms of the housing extend from the upper cover and have the main body positioned between the two extending arms, for fixing the main body under the upper cover, and when the main body is under the housing, the front of the two extending arms of the housing is flush with the front of the main body; and
   an input section placed on the front half of the main body for generating (inputting) key signals, wherein the top surface of the front half and the top surface of the back half of the main body join with no gap between them.

2. The pointing device of claim 1 wherein the bottom side of the housing and the bottom side of the main body are fixed at the same level.

3. The pointing device of claim 1 is a mouse.

4. The pointing device of claim 1 wherein the input section comprises two keys and a wheel that is placed between the two keys.

5. The pointing device of claim 1 further comprising a guide and a track that are placed between the housing and the main body in order to freely change the position of the housing with respect to the main body.

6. The pointing device of claim 1 wherein the main body further comprises a plurality of notches;
   the housing further comprises a latch; and
   the latch comprises a tooth;
   wherein the position of the housing with respect to the main body is fixed by fitting the tooth of the latch into the plurality of notches so that the tooth of the latch fits into a corresponding notch from the plurality of notches.

7. The pointing device of claim 1 wherein the main body further comprises a plurality of notches;
   the housing comprises a latch; and
   the latch comprises two teeth;
   wherein the positions of the housing with respect to the main body is fixed by fitting the two teeth of the latch into corresponding notches from the plurality of notches.

8. A pointing device comprising:
   a housing comprising:
      a first edge; and
      two extending arms;
   a main body retractably fixed under the housing and fixed between the two extending arms of the housing, wherein when the main body is under the housing, the front part of the two extending arms of the housing is flush with the front of the main body, wherein a fixed space exists between the first edge of the housing and a surface of the main body, the fixed space being only large enough for first edge of the housing to slide over the surface of the main body when the positions of the housing and main body relative to each other are adjusted;
   an input section placed on the main body and exposed out from the housing;
   wherein when the positions of the main body and the housing relative to each other are adjusted, a fixed space exists between the first edge and the surface of the main body.

9. The pointing device of claim 8 wherein the bottom side of the housing and the bottom side of the main body are fixed at the same level.

10. The pointing device of claim 8 is a mouse.

11. The pointing device of claim 8 wherein the input section comprises two keys and a wheel that is placed between the two keys.

12. The pointing device of claim 8 further comprising a guide and a track that are placed between the housing and the main body in order to freely change the position of the housing with respect to the main body.

13. The pointing device of claim 8 wherein the main body further comprises a plurality of notches;
   the housing further comprises a latch; and
   the latch comprises a tooth;
   wherein the position of the housing with respect to the main body is fixed by fitting the tooth of the latch into the plurality of notches so that the tooth of the latch fits into a corresponding notch from the plurality of notches.

14. The pointing device of claim 8 wherein the main body further comprises a plurality of notches;
   the housing comprises a latch; and
   the latch comprises two teeth;
   wherein the positions of the housing with respect to the main body is fixed by fitting the two teeth of the latch into corresponding notches from the plurality of notches.

15. A pointing device comprising:
   a housing comprising:
      a first bottom side;
      an upper cover; and
      two extending arms;
   a main body comprising a second bottom side and retractably fixed under the housing, wherein the main body is fixed between the two extending arms of the housing and under the upper cover, and when the main body is under the housing, the front of the two extending arms of the housing is flush with the front of the main body; and
   an input section placed on the main body;
   wherein the first bottom side and the second bottom side together form a flat surface, and when the positions of the main body and the housing relative to each other are adjusted, the first bottom side and the second bottom side continue to form the flat surface.

16. The pointing device of claim 15 is a mouse.

17. The pointing device of claim 15 wherein the input section comprises two keys and a wheel that is placed between the two keys.

18. The pointing device of claim 15 further comprising a guide and a track that are placed between the housing and the main body in order to freely change the position of the housing with respect to the main body.

19. The pointing device of claim 15 wherein the main body further comprises a plurality of notches;
   the housing further comprises a latch; and
   the latch comprises a tooth;
   wherein the position of the housing with respect to the main body is fixed by fitting the tooth of the latch into the plurality of notches so that the tooth of the latch fits into a corresponding notch from the plurality of notches.

20. The pointing device of claim 15 wherein the main body further comprises a plurality of notches;
the housing comprises a latch; and
the latch comprises two teeth;
wherein the positions of the housing with respect to the main body is fixed by fitting the two teeth of the latch into corresponding notches from the plurality of notches.

* * * * *